United States Patent
Stickler et al.

(10) Patent No.: US 10,713,602 B2
(45) Date of Patent: *Jul. 14, 2020

(54) AGGREGATING ENTERPRISE GRAPH CONTENT AROUND USER-GENERATED TOPICS

(71) Applicant: Microsoft Technology Licensing, LLC, Redmond, WA (US)

(72) Inventors: Joshua Stickler, Oslo (NO); Christopher Kehler, Seattle, WA (US); Dmitriy Meyerzon, Bellevue, WA (US); Victor Poznanski, Sammamish, WA (US); Ashok Kuppusamy, Oslo (NO); Oleg Melnychuk, Oslo (NO); Charles Reeves Little, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,386

(22) Filed: Feb. 14, 2019

(65) Prior Publication Data
US 2019/0180204 A1 Jun. 13, 2019

Related U.S. Application Data

(63) Continuation of application No. 14/469,943, filed on Aug. 27, 2014, now Pat. No. 10,255,563, which is a
(Continued)

(51) Int. Cl.
*G06F 3/00* (2006.01)
*G06Q 10/06* (2012.01)
(Continued)

(52) U.S. Cl.
CPC .............. *G06Q 10/06* (2013.01); *G06Q 30/02* (2013.01); *G06F 8/34* (2013.01); *G11B 27/034* (2013.01)

(58) Field of Classification Search
None
See application file for complete search history.

(56) References Cited

U.S. PATENT DOCUMENTS

| 6,745,195 B1 | 6/2004 | Kornfein et al. |
| 7,668,821 B1 | 2/2010 | Donsbach et al. |

(Continued)

FOREIGN PATENT DOCUMENTS

| CN | 102150161 A | 8/2011 |
| CN | 102298612 A | 12/2011 |

(Continued)

OTHER PUBLICATIONS

Jiangfeng Chen et al., Towards Topic Trend Prediction on a Topic Evolution Model with Social Connection, Apr. 30, 2013, IEEE, pp. 1-5 (Year: 2013).*

(Continued)

*Primary Examiner* — Tam T Tran

(57) ABSTRACT

Aggregation of content based on user-generated topics is provided. Users may associate one or more topics with content items stored across various workloads and repositories. A topic may be a word or phrase of the user's choice, and may be utilized for discoverability of information and aggregation of content items. Topics and content items associated with topics may be acted on (e.g., a user may add or delete topics to associate with a content item, associate or disassociate content items with a topic, embed a set of content items or a stream of content items associated with a topic into other experiences, follow topics, etc.). Content items identified as related to a specific topic may be automatically suggested as possible content items of interest to (Continued)

the user. Additionally, when a user follows a topic, the user may be notified of any changes that occur to the topic.

20 Claims, 14 Drawing Sheets

Related U.S. Application Data continuation-in-part of application No. 14/195,243, filed on Mar. 3, 2014, now Pat. No. 10,394,827.

(51) Int. Cl.
*G06Q 30/02* (2012.01)
*G06F 8/34* (2018.01)
*G11B 27/034* (2006.01)

(56) References Cited

U.S. PATENT DOCUMENTS

| | | | |
|---|---|---|---|
| 8,117,197 | B1 | 2/2012 | Cramer |
| 8,548,996 | B2 | 10/2013 | Tareen et al. |
| 8,572,477 | B1 | 10/2013 | Moskovitz et al. |
| 8,832,091 | B1 | 9/2014 | Bhagat et al. |
| 8,898,156 | B2 | 11/2014 | Xu et al. |
| 9,195,679 | B1 | 11/2015 | Svendsen |
| 2002/0091736 | A1 | 7/2002 | Wall |
| 2006/0294085 | A1* | 12/2006 | Rose ................ G06F 16/9535 |
| 2009/0125560 | A1 | 5/2009 | Munekuni et al. |
| 2009/0256678 | A1 | 10/2009 | Ryu |
| 2009/0327271 | A1 | 12/2009 | Amitay et al. |
| 2011/0145275 | A1 | 6/2011 | Stewart |
| 2011/0264737 | A1 | 10/2011 | Skinner |
| 2012/0079004 | A1 | 3/2012 | Herman |
| 2012/0210240 | A1 | 8/2012 | Neystadt et al. |
| 2012/0215773 | A1 | 8/2012 | Si et al. |
| 2013/0046826 | A1 | 2/2013 | Stanton |
| 2013/0167059 | A1 | 6/2013 | Legris |
| 2013/0290323 | A1 | 10/2013 | Saib |
| 2013/0298038 | A1 | 11/2013 | Spivack et al. |
| 2014/0007860 | A1 | 1/2014 | Lu |
| 2014/0181083 | A1 | 6/2014 | Macho et al. |
| 2014/0195605 | A1 | 7/2014 | Kallayil |
| 2014/0208234 | A1 | 7/2014 | Amit et al. |
| 2014/0215351 | A1* | 7/2014 | Gansca ................ G06Q 50/01 715/751 |
| 2014/0278986 | A1 | 9/2014 | Rouse et al. |
| 2014/0324850 | A1* | 10/2014 | Magnaghi ............... G06F 16/00 707/731 |
| 2014/0337316 | A1 | 11/2014 | Abuelsaad et al. |
| 2014/0344288 | A1* | 11/2014 | Evans ................ G06F 3/0484 707/749 |
| 2015/0039632 | A1 | 2/2015 | Leppanen et al. |
| 2015/0067505 | A1* | 3/2015 | Metcalf ................ G06F 16/958 715/716 |
| 2015/0106191 | A1 | 4/2015 | Ge et al. |
| 2015/0142785 | A1 | 5/2015 | Roberts et al. |

FOREIGN PATENT DOCUMENTS

| | | |
|---|---|---|
| CN | 102567326 A | 7/2012 |
| CN | 102906689 A | 1/2013 |
| CN | 102930035 A | 2/2013 |
| EP | 2409271 A2 | 1/2012 |
| WO | 2012129400 A2 | 9/2012 |

OTHER PUBLICATIONS

Keizo Oyama et al., Analysis of Topics and Relevant Documents for Navigational Retrieval on the Web, Jan. 1, 2005, IEEE Computer Society, pp. 1-6 (Year: 2005).*
"Final Office Action Issued in U.S. Appl. No. 14/064,393", dated Mar. 4, 2019, 19 Pages.
"Office Action Issued in European Patent Application No. 15710632.9", dated Feb. 18, 2019, 07 Pages.
"First Office Action and Search Report Issued in Chinese Patent Application No. 201580010703.5", dated Mar. 8, 2019, 12 Pages.
"First Office Action and Search Report Issued in Chinese Patent Application No. 201580011895.1", dated Mar. 5, 2019, 18 Pages.
"Second Office Action and Search Report Issued in Chinese Patent Application No. 201480058874.0", dated Jun. 26, 2019, 14 Pages.
"Advisory Action Issued in U.S. Appl. No. 14/064,393", dated Jun. 6, 2019, 6 Pages.
"Final Office Action Issued in U.S. Appl. No. 14/194,700", dated May 20, 2019, 25 Pages.
"Notice of Allowance Issued in U.S. Appl. No. 14/195,243", dated May 1, 2019, 10 Pages.
"Final Office Action Issued in U.S. Appl. No. 14/296,747", dated May 1, 2019, 30 Pages.
Bakhshandeh, et al., "Personalized Search Based on Micro-Blogging Social Networks", In Proceedings of the CSI International Symposium on Artificial Intelligence and Signal Processing, May 2, 2012, 4 Pages.
Mishra, et al., "Improving Mobile Search through Location Based Context and Personalization", In Proceedings of the International Conference on Communication Systems and Network Technologies, May 11, 2012, 5 Pages.
"Office Action Issued in European Patent Application No. 15771764.6", dated May 13, 2019, 9 Pages.
"Non Final Office Action Issued in U.S. Appl. No. 14/296,747", dated Jan. 30, 2020, 32 Pages.
"Non-Final Office Action Issued in U.S. Appl. No. 14/064,393", dated Sep. 26, 2019, 20 Pages.
"Non Final Office Action Issued in U.S. Appl. No. 14/194,700", dated Nov. 5, 2019, 27 Pages.
"Non Final Office Action Issued in U.S. Appl. No. 15/833,453", dated Dec. 17, 2019, 42 Pages.
"Second Office Action Issued in Chinese Patent Application No. 201580011895.1", dated Aug. 9, 2019, 6 Pages.
"Final Office Action Issued in U.S. Appl. No. 14/192,235", dated Jul. 25, 2019, 14 Pages.
"Second Office Action Issued in Chinese Patent Application No. 201580010703.5", dated Oct. 24, 2019, 5 Pages.
"Notice of Allowance Issued in U.S. Appl. No. 14/194,700", dated Apr. 15, 2020, 9 Pages.
"Non Final Office Action Issued in U.S. Appl. No. 14/192,235", dated Apr. 17, 2020, 16 Pages.
"Office Action Issued in Mexican Patent Application No. MX/a/2017/002699", dated Feb. 14, 2020, 7 Pages.
"Office Action and Search Report Issued in Chinese Patent Application No. 201580047507.5", dated Apr. 3, 2020, 13 Pages.
"Final Office Action Issued in U.S. Appl. No. 15/833,453", dated May 4, 2020, 30 Pages.

* cited by examiner

MOBILE COMPUTING DEVICE

AGGREGATING ENTERPRISE GRAPH CONTENT AROUND USER-GENERATED TOPICS

CROSS-REFERENCE TO RELATED APPLICATIONS

This application is a continuation of U.S. patent application Ser. No. 14/469,943 (now U.S. Pat. No. 10,255,563), titled "AGGREGATING ENTERPRISE GRAPH CONTENT AROUND USER-GENERATED TOPICS" filed Aug. 27, 2014, which application is a continuation-in-part of U.S. patent application Ser. No. 14/195,243 (now U.S. Pat. No. 10,394,827), titled "Discovering Enterprise Content Based on Implicit and Explicit Signals" filed Mar. 3, 2014, the complete disclosures of which are hereby incorporated by reference in their entirety.

BACKGROUND

In an enterprise, content items are oftentimes scattered across a variety of workloads and storage systems (e.g., email, social feeds, intranet sites, network file systems, etc.). Individuals in the enterprise may spend time and effort searching for content or asking another individual to share content. Searching for content may require a user to either browse through folder structures in individual workloads or conduct a search using an individual's name or search terms that match the content for which he/she is searching. For example, a user may be presented with a list view of content items from a single source. Additionally, sometimes an individual may not be aware that certain pieces of content that may be relevant to his/her work have already been created, causing a duplicated effort.

It may be desirable for users to receive an aggregation of content around user-selected topics. For example, an interior decorator may want to aggregate room designs that he/she and other subjectively determine to be good examples of room designs. As another example, a finance team that is tasked with reducing costs may wish to aggregate expense reports from various business divisions.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present invention solve the above and other problems by recommending relevant content to a user based on personalized implicit (e.g., reading) and explicit (e.g., sharing) activity signals aggregated for various content items. An enterprise graph may be implemented that is utilized to connect individuals and content by tracking user activities associated with content (e.g., sharing, modifying, viewing, etc.). For example, a user may query the graph to retrieve content items modified by the user over a certain time period. In addition to providing retrieval of content across various workloads, an application powered by the graph may proactively suggest additional content that may be relevant to the user. For example, if N of the user's colleagues view a specific document, the document may be determined to be likely of interest to the user.

A user is provided with situational awareness of various content items by aggregating and displaying content that has been acted on by people the user works with most closely. Relationships between people and activities around content may be represented in the enterprise graph, which may be surfaced to the user. Content and relationship information pertaining to content may be surfaced to the user via a user interface component, referred to herein as a landing page.

According to aspects, an indication to display an aggregated view of content items relevant to a user may be received, and a determination may be made as to which content items from one or more repositories to display according to a relevance ranking associated with the content items. A user interface may be generated for displaying the content items, wherein the content items may be displayed in an order according to the relevance ranking.

The user may query the content on the landing page according to a variety of queries, for example, "popular with my colleagues," "viewed by me" (i.e., the querying user), "worked on by me," "most viewed," and the like.

In addition, aspects of the present invention solve the above and other problems by providing an aggregation of content based on user-generated topics. The content may be stored across various workloads and repositories, and may be connected by one or more common topics. Users may be enabled to navigate to views of topics, and act on topics or on content associated with topics. For example, a user may add or delete topics to associate with a content item, associate or disassociate content items with a topic, embed a set of content items associated with a topic into other experiences, embed a stream or feed of content items associated with a topic into other experiences, follow topics, etc. Content items that may be related to a specific topic may be automatically suggested as possible content items of interest to the user. Additionally, topics may be selectively followed by a user. When a user follows a topic, the user may be notified of any changes that occur to the followed topic (e.g., another user associates a document with the topic). Further, the relevance ranking of the aggregated content items displayed to the user in a landing page may take into account topics in which the user is actively interested.

Examples may be implemented as a computer process, a computing system, or as an article of manufacture such as a computer program product or computer readable media. The computer program product may be a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIG. 2B illustrates an example search query in an example landing page UI comprising a grid of aggregated content items;

FIG. 3A illustrates an aggregated grouping of content items, some of which have one or more topics associated and displayed with them;

FIG. 3C illustrates a display of suggested topics to associate with a content item;

DETAILED DESCRIPTION

Figure 1:
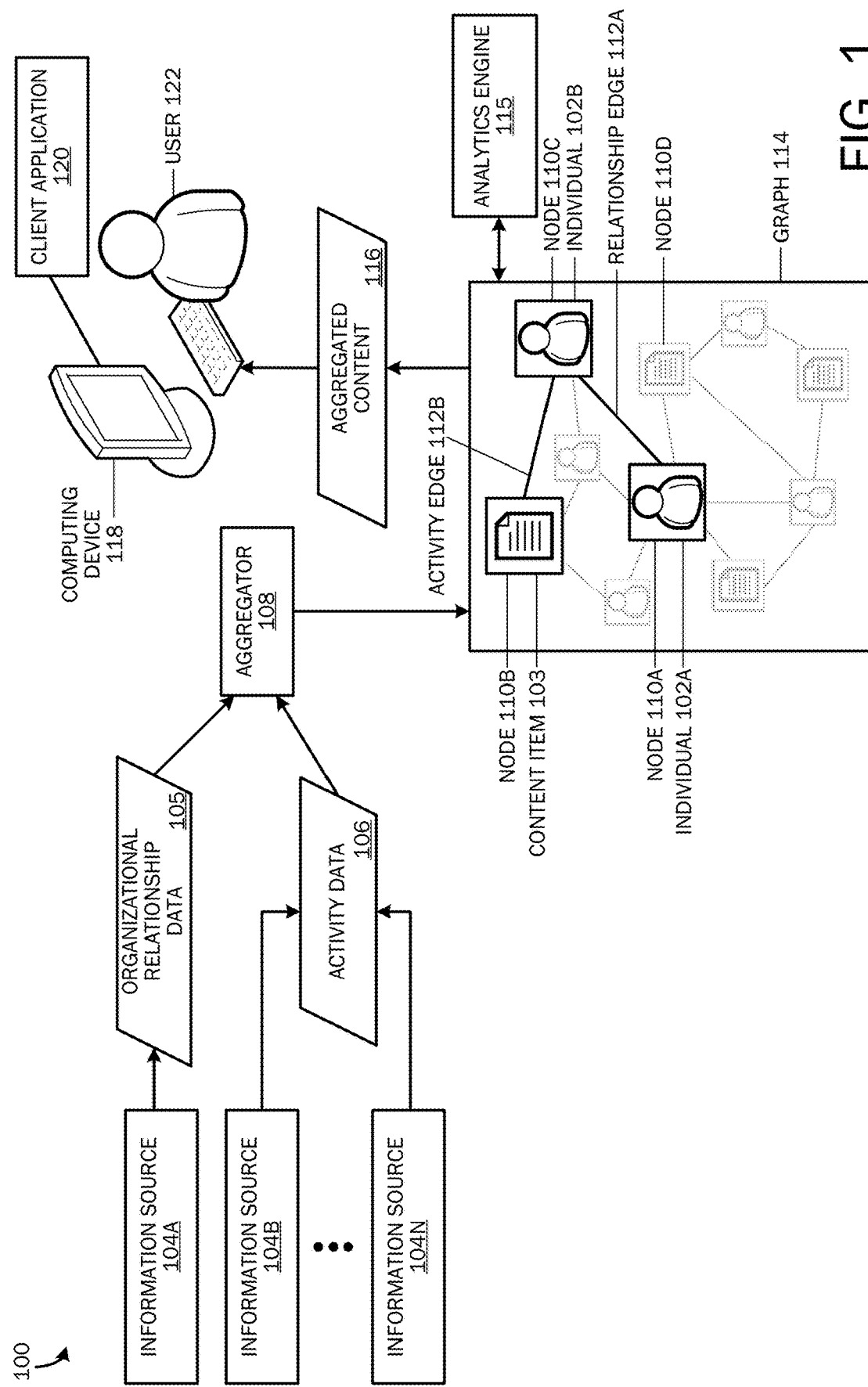
FIG. 1 illustrates a system that may be used to implement examples described herein.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

Examples of the present disclosure are directed to recommending relevant content to a user based on personalized implicit (e.g., reading) and explicit (e.g., sharing) activity signals aggregated for various content items. Content may be aggregated from multiple content sources and may be surfaced to a user on a user interface (UI) display (sometimes referred to herein as a "landing page"). Navigation of surfaced content may be enabled via one or more predefined queries or "boards" that algorithmically aggregate content matching certain parameters. Content may be recommended to the user based on the user's recent activities, the user's interactions with other users, as well as, activities of the other users.

Additionally, examples of the present disclosure are directed to providing an aggregation of content based on user-generated topics. Users may generate and curate topics that may be utilized for aggregating various content items stored across various workloads and repositories. Users may act on topics or on content items associated with topics. For example, a user may add or delete topics to associate with a content item, associate or disassociate content items with a topic, embed a set of content items associated with a topic into other experiences, embed a stream or feed of content items associated with a topic into other experiences, follow topics, etc. Content items that may be related to a specific topic may be automatically suggested as possible content items of interest to the user. Additionally, topics may be selectively followed by a user. When a user follows a topic, the user may be notified of any changes that occur to the topic (e.g., another user associates a document with the topic).

Referring now to the drawings, in which like numerals represent like elements, various aspects will be described. FIG. 1 illustrates a system 100 that may be used to implement some examples. The system 100 includes an aggregator 108 operable to collect organizational relationship data 105 for individuals, activity data 106 associated with individuals 102A-B (collectively 102), and content items 103 from a plurality of information sources 104A-N (collectively 104), and store the relationship data 105 and activity data 106 in a graph 114. The information sources 104 may include various types of workloads or information sources such as social networking services, enterprise social network services, online productivity software suites (which may include applications such as, but not limited to, a word processing application, a spreadsheet application, a slide presentation application, a notes taking application, an electronic mail application, a calendaring application, a video conferencing, an instant messaging application, etc.), collaboration services, communication software, collaborative web applications (e.g., wikis, blogs, etc.), video creation applications, etc.

Activity data 106 may comprise various types of information such as, but not limited to, presence data, interaction data, data associated with communication with another person (e.g., emailing, messaging, conferencing, etc.), data associated with an individual's activity stream (e.g., authoring or modifying a document, liking, commenting, following, or sharing a document, following a person, commenting on a feed, etc.), trending data, group membership (e.g., inclusion in a distribution list, attendee in a meeting invitation, etc.). Organizational relationship data 105 may comprise various types of information such as, but not limited to, data associated with a project structure or organizational structure (e.g., who an individual works with, works for, is a peer to, directs, manages, is managed by, etc.).

As mentioned above, the organizational relationship data 105 and activity data 106 may be stored in a graph 114. Activities and people relationships may be stored as edges 112A-B (collectively 112), and individuals 102 who act upon a content item 103 or interact with another individual 102, content items 103 that are acted upon may be stored as nodes 110A-C (collectively 110). For example, a node 110 may include an individual 102 (nodes 110A and 110C), a group of individuals, a content item 103 such as a document (node 110B), an email or other communication type, a webpage, etc.

An edge 112 may include various types of actions (i.e., activity edge 112B) (e.g., like, comment, follow, share, authoring, modifying, communication, participation, etc.) and relationships (i.e., relationship edge 112A). Consider for example that an individual 102 "likes" a certain document (i.e., selects a "like" option associated with the document). The individual and the document (content item 103) may be stored as nodes 110 and the "like" selection may be stored as an edge 112.

A relationship edge 112A may include explicit relationships and/or implicit relationships. Explicit relationships may include relationships defined according to an organization structure and data (i.e., organizational relationship data 105). For example, an explicit relationship may include an individual's manager, peers, directs, etc. An explicit relationship may be stored as a relationship edge 112A such as a manager edge, peer edge, directs edge, etc. Implicit relationships may include relationships determined according to activity in one or more workloads (i.e., activity data 106 from one or more information sources 104). For example, an implicit relationship may include an individual 102 following another individual on an enterprise social network service (information source 104), being included on a distribution list with another individual, is a co-author of a document with another individual, emailing (or other type of communication) with another individual, group memberships, commenting on another individual's feed, etc.

Edges 112 may also include inferred edges that may be created between a first individual 102 and a content item 103 acted upon or a person interacted with by a second individual 102 with whom the first individual 102 shares a relationship edge 112A. An inferred edge may also be created between a first individual 102 and a second individual 102 when the second individual acts upon a content item 103 with which the first individual 102 shares an activity edge 112B. For example, a first individual 102 named Ann may share a relationship edge 112A with a second individual 102 named Bob. An inferred edge 112 may be created between Ann and a content item 103 that Bob modifies.

The system 100 may comprise an analytics engine 115 operable to calculate and apply weights on edges 112 according to what activity is performed (e.g., a like, comment, share, follow, email, etc.) and the relationship between a first individual 102 and an individual(s) 102 performing the activity. Weights may also be based on how recently an activity was performed. A weight on a relationship edge 112A may be based on implicit or explicit signals generated through activity on the plurality of workloads, such as an amount and type of activity an individual 102 has with another person, a number of times an individual 102 interacts with a content item 103, the type of interaction, etc. For example, if an individual 102 communicates via email with a first information worker (IW) daily and is frequently an attendee of meetings that the first IW is also an attendee of, the weight of a relationship edge 112A between the individual 102 and the first IW may be higher than the weight of a relationship edge 112A between the individual 102 and a second IW whom the individual 102 emails less frequently and who share a common "like" of a document on a social network site. A weight on an activity edge 112B may also be based on a type of activity. For example, an "edit" or "share" operation may be considered more important than a "like" operation, and thus may have a higher weighting than the "like" operation. An individual's relationship edges 112A and activity edges 112B may be ranked according to their calculated weights.

The analytics engine 115 may be further operable to automatically generate one or more selectable tags to associate with a content item 103, wherein a tag identifies a property of the content item 103. According to an aspect, a tag may identify an activity edge 112B. For example, for a given user 122, a tag may identify if a content item 103 has been presented to the user 122, shared with the user 122 (e.g., via email, via a file hosting service, etc.), trending around the user 122, trending around other individuals 102, worked on by the user 122, viewed by the user 122, followed by the user 122, contributed to by the user 122, modified by the user 122, viewed by, worked on, commented on, followed by, or modified by an individual 102 with whom the user 122 has an implicit or explicit relationship, etc.

In accordance with an aspect of the present disclosure, a given user 122 may be enabled to associate one or more topics with a content item 103, wherein a topic is a specific word or phrase of the user's choosing that may be applied to a content item 103 for meaningful categorization and improved discoverability of content stored in a variety of repositories and workloads (i.e., information sources 104). As stated, topics may be words or phrases of the user's choosing, and thus allow subjective topics to be applied to content items 103 that may not be automatically inferred by the analytics engine 115. For example, a website designer may want to aggregate website designs that he/she or another individual 102 subjectively determines to be good examples of website designs. A relationship may be established in the graph 114 between content items 103 by common topics.

Consider the following example: a user 122 is putting a presentation together about a subject with which he is not overly familiar. The user 122 may wish to pull information about the subject from various documents (i.e., content items 103) stored in various repositories and workloads in his organization, and aggregate them to where he may be able to view them in one place. Instead of creating a new folder and duplicating files, aspects of the present disclosure may allow for individuals 102 to add topics to content items 103, such that search queries may be made by topic, and an aggregated view of content items 103 matching the searched topic may be provided. Accordingly, discovery of content items 103 across various repositories may be improved. In addition, the user 122 is able to spend less time searching for documents, computing time is reduced by not requiring the user 122 to execute search queries in various repositories, and storage space is saved by not duplicating files and saving the files in an aggregated folder. The user 122 may add additional topics, which may help other individual 102 who may be searching for content.

When a topic is added to a content item 103, the analytics engine 115 may be operable to suggest other topics for the user 122 to add to the content item 103 based on a variety of factors, for example, based on topics recently interacted with by the user 122, globally trending topics, and topics determined to be relevant to the content item 103 based on machine learning.

The analytics engine 115 may be further operable to suggest additional content items 103 to associate with a given topic. Similarly to how inferred edges may be created between individuals 102, as well as between an individual 102 and a content item 103, in accordance with an aspect, an inferred edge may be created between content items 103, as well as between topics. For example, consider a collection of twenty documents (i.e., content items 103) that have an associated topic of "transportation." A twenty-first document (i.e., content item 103) may exist that is about cars and authored by the same individual(s) 102 who authored the other twenty content transportation documents. Via one or more various analysis methods (e.g., text similarity, vocabulary similarity, semantics similarity, topic similarity, etc.), the twenty-first document may be identified as being related to the "transportation" topic. Accordingly, a suggestion may be made to associate the twenty-first document with the "transportation" topic.

In accordance with an example, an aggregated view of top ranking content items 103 based on relevance to a user 122 may be presented to the user 122, wherein the user 122 is an individual 102 represented in the graph 114. The aggregated content items (aggregated content 116) may be displayed as a grid in a first board referred to herein as a landing page. The content items 103 may be stored across a variety of different repositories and workloads (i.e., information sources 104), and may be persisted and tracked in the graph 114 as described above. The aggregated content 116 may comprise a plurality of content items 103 recommended to the user 122 based on his/her activity, his/her interactions with other individuals 102 and their recent activity.

For a given set of results of an aggravated view of content items 103 displayed to a user 122, one or more topics associated with each content item 103 may be automatically visible or visibly accessible via a selection to display associated topics (e.g., right-click gesture, expansion of results for greater visual prominence, etc.). That is, for a given content item 103, all associated topics may be provided and displayed. A user 122 may be enabled to manage the topics associated with a content item 103. For example, a user 122 may add a topic to or remove a topic from a content item 103.

According to an aspect, a user 122 may be enabled to navigate to a view of a topic, where content items 103 associated with the topic may be displayed. For example, if a user 122 sees a document about a car, a user interface (UI) element may be displayed indicating that the document is associated with a "transportation" topic. The user 122 may select on the UI element for the "transportation" topic, and thereby navigate to a view of content items 103 associated with the "transportation" topic.

Additionally, a user 122 may be enabled to take actions on a set of content items 103 associated with a topic. For example, a user 122 may choose to share a topic and its associated content items 103 with other individuals 102, as well as associate or disassociate content items 103 with the topic. In addition, a set of content items 103 associated with a topic may be embedded into other experiences, or a stream of content items 103 associated with a topic may be embedded into other experiences. For example, the user 122 may want to refer to all content items 103 associated with the "transportation" topics in a blog post about transportation. Accordingly, the user 122 may embed a fixed set of content items 103 that have been associated with a given topic as of a certain point in time (i.e., a snapshot), or may embed a stream or feed of content items 103 associated with a topic. In a case where a stream or feed of content items 103 associated with a topic is embedded, the embedded stream/feed may comprise a current state of content items 103 associated with the topic. Topics, as well as the landing page and other boards, will be described in further detail below with reference to FIGS. 2A-2C and FIGS. 3A-3C.

The aggregated view of content items 103 may be presented to the user 122 via a client application 120 on a computing device 118. The computing device 118 may be one of a variety of suitable computing devices described below with reference to FIGS. 5 through 7. For example, the computing device 118 may include a tablet computing device, a desktop computer, a mobile communication device, a laptop computer, a laptop/tablet hybrid computing device, a gaming device, or other type of computing device for executing applications 120 for performing a variety of tasks.

The application 120 illustrated in association with computing device 118 is illustrative of any application having sufficient computer executable instructions for enabling aspects of the present invention as described herein. The application 120 may include a thick client application, which may be stored locally on the computing device 118, or may include a thin client application (i.e., web application) that may reside on a remote server and accessible over a network, such as the Internet or an intranet. A thin client application may be hosted in a browser-controlled environment or coded in a browser-supported language and reliant on a common web browser to render the application executable on a computing device 118.

Figure 2A:
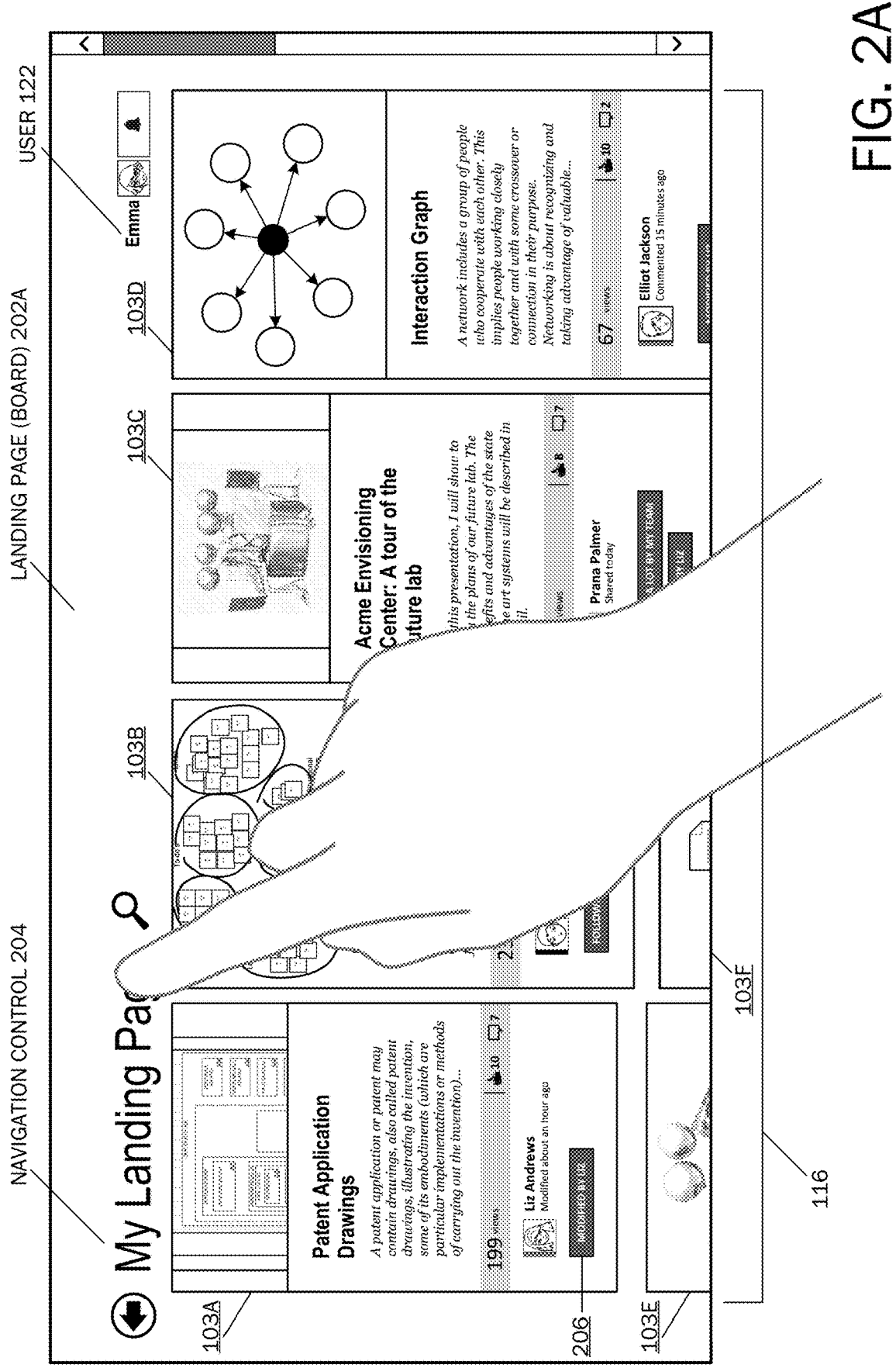
FIG. 2A illustrates an example landing page UI comprising a grid of aggregated content items.

As briefly described above, aggregated content items (aggregated content 116) may be displayed in a first board, referred to herein as a landing page. Referring now to FIG. 2A, an example landing page 202A is illustrated that may be displayed on any suitable computing device 118 described above. The landing page 202A may comprise a plurality of content items 103 A-F (collectively 103) displayed in a grid. The content items 103 may be organized and ordered according to a relevance ranking. According to an aspect, the content items 103 may be displayed as selectable objects comprising one or more of a visual representation of the content item 103 (e.g., a thumbnail image or other salient image that is extracted from the content item 103), the title of the content item 103, activity insights (e.g., number of views, a number of likes, a number of followers, a number of comments, etc.), a summary or brief description of the content item, 103, etc. Other information may also be provided, such as an individual 102 the user 122 shares a relationship edge 112A with who has acted on the content item 103, the action taken, and how recently the action took place. For example, as illustrated in FIG. 2A, the first content item 103A shows that an individual 102 Liz Andrews modified the content item 103A "about an hour ago."

As illustrated, one or more automatically generated selectable tags 206 may be associated with and displayed with a content item 103, wherein a tag 206 identifies a property of the content item 103. As described above, a tag 206 may identify an activity edge 112B. For example, for a given user 122, a tag may identify if a content item 103 has been presented to the user 122, shared with the user 122 (e.g., via email, via a file hosting service, etc.), trending around the user 122, trending around other individuals 102, worked on by the user 122, viewed by the user 122, followed by the user 122, contributed to by the user 122, modified by the user 122, viewed by, worked on, commented on, followed by, or modified by an individual 102 with whom the user 122 has an implicit or explicit relationship, etc. As illustrated in the example landing page 202A in FIG. 2A, a first displayed content item 103A has a "modified by Liz" tag 206 associated and displayed with it. As mentioned, tags 206 may be selectable. Selection of a tag 206 may initiate a search query for additional content items 103 matching the selected tag 206. Continuing with the illustrated example, if the user were to select the "modified by Liz" tag 206, a query for other content items 103 that have been modified by Liz may be initiated, and results of the query may be displayed in a board 202.

According to aspects of the present disclosure, a user 122 may pivot between boards 202A-B (collectively 202) or navigate to a predefined or to a user-defined query via selection of a navigation control 204. As illustrated in FIG. 2A, a title or header of a board 202 may be a selectable navigation control 204. When selected, the user 122 may select from a predefined query or may enter a search query for content items 103 meeting certain criteria.

Figure 2B:
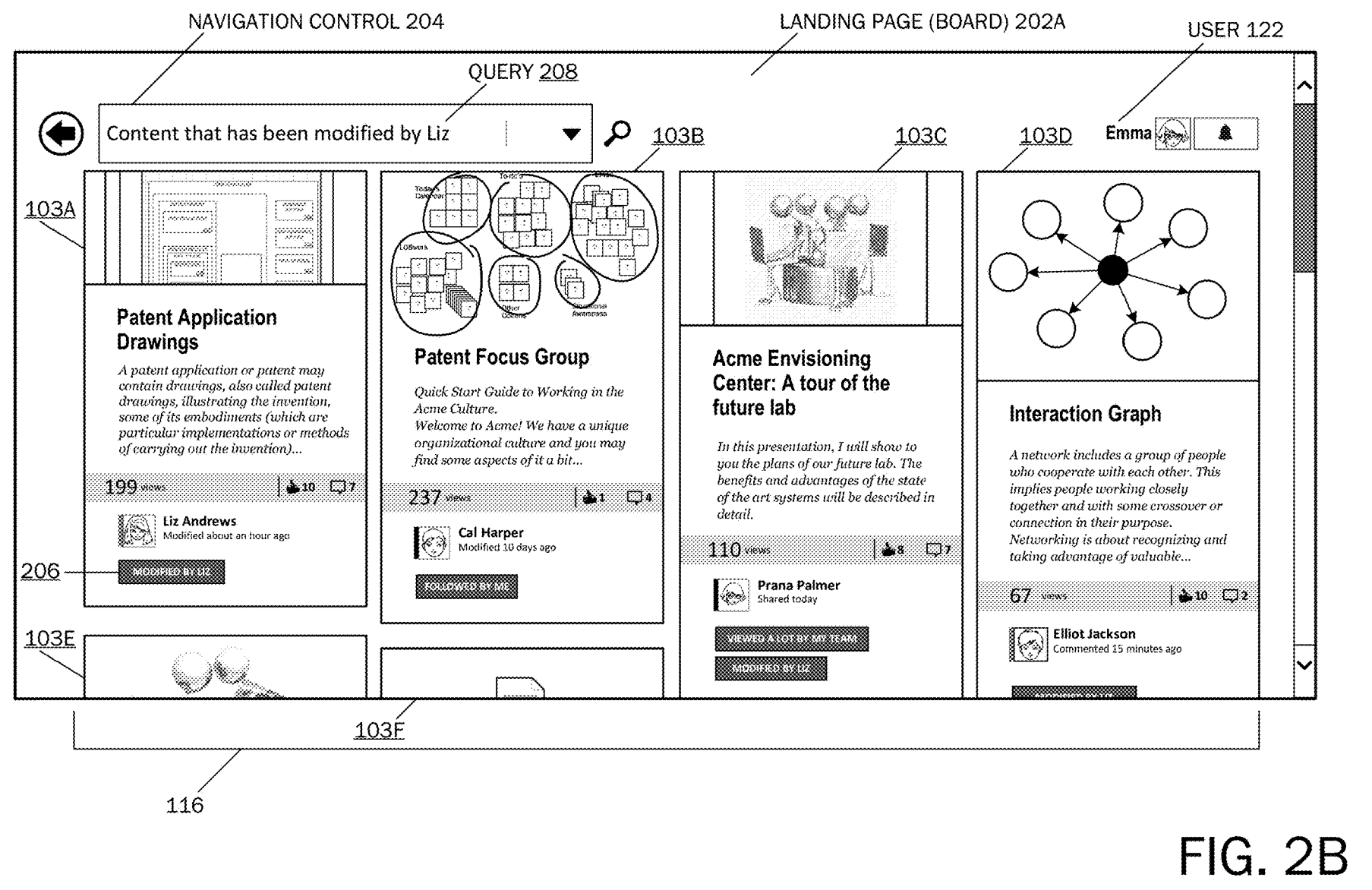

Referring now to FIG. 2B, the example landing page 202A of FIG. 2A is shown, and as illustrated, the user 122 may enter a search query 208. In the example illustrated in FIG. 2B, the user 122 selectively enters a search query 208 for content that has been modified by Liz. Various types of search queries may be conducted. For example, the user 122 may search for content items 103 that the user 122 has had some form of interaction with (e.g., content items 103 that have been recommended to the user 122, content items 103 that the user 122 has worked on previously, content items 103 that have been presented to the user, content that a particular colleague has worked on, modified, commented on, followed, etc.). The user 122 may also search for content items 103 associated with a certain topic (i.e., an exploratory search) or for content items 103 the user 122 has seen elsewhere (e.g., search for an email previously viewed in an email inbox application).

As described above, to navigate or pivot to another board 202 or query, the user 122 may select from a predefined query or may enter a search query for content items 103 meeting certain criteria. Predefined queries may comprise, but are not limited to, a "popular with my colleagues" query, a "viewed by me" query, a "worked on by me" query, and a "most viewed query." Content items 103 matching criteria of a predefined query may be pre-aggregated, such that when a user selects a predefined query 208, the pre-aggregated content items 103 may be retrieved from the graph 114 and displayed in a new board 202.

Figure 2C:
FIG. 2C illustrates results from an example search query displayed as an aggregated grouping of content items.

Referring now to FIG. 2C, results from the search query 208 are shown displayed in a "modified by Liz" board 202B. According to one aspect, all results may be presented. According to another aspect, a top n results may be displayed, wherein the top n results may be content items 103 with the highest ranking edges 112 as determined according to such factors as the type of activity performed (e.g., viewing, following, commenting on, liking, etc.), how close of a relationship the user 122 has with individual(s) 102 performing the activity, how recently the activity was performed, etc. The n may be a predetermined number or a selectable number. According to aspects, the ranking may be according to the query 208 in context. For example, if a "worked on by me" query is selected, content items 103 that have been worked on by the user 122 may be aggregated and ranked in chronological order, while if a "popular with my colleagues" query is selected, content items 103 may be ranked according to a predictive relevance score.

Referring still to FIG. 2C, content items 103 matching the query 208 of "modified by Liz" are shown displayed in the "modified by Liz" board 202B. As described above, the content items 103 may be ranked and displayed in order of relevance to the user 122. The user 122 may select the navigation control 204 (i.e., title or header) and select or enter another search query 208, may navigate back to the landing page 202A, or may select a content item 103 for additional information or to act on the content item.

According to examples, a query 208 may be further personalized to a user 122 based on analytics developed about the user 122. A profile may be developed for a user 122 comprising topic affinities, people affinities, etc. For example, a determination may be made that a particular user 122 searches for content of a certain topic, for example, "Ergonomics," and/or views, shares, and comments on a number of content items 103 about "Ergonomics." Accordingly, content items 103 that are associated with "Ergonomics" may be ranked higher for the user 122 than content items of another topic. As can be appreciated, two users 122 could enter an almost identical search; however, because one user has a profile that orients them toward a certain topic, in this example, "Ergonomics," content items 103 that are associated with "Ergonomics" may appear in the user's board 202 whereas other content items 103 may be presented to the other user. Additionally, different users 122 may have different permissions, and thus each user 122 may be provided with different aggregated content 116 according to his/her permissions.

As described above, one or more topics 302 may be associated with content items 103 tracked in the graph 114, wherein a topic 302 is a specific word or phrase of the user's choosing that may be applied to a content item 103 for meaningful categorization and improved discoverability of content stored in a variety of repositories and workloads (i.e., information sources 104). For a given set of results for a content item content feed or persisted graph 114 query, the one or more topics 302 associated with each result may be displayed as illustrated in FIG. 3A.

Figure 3A:
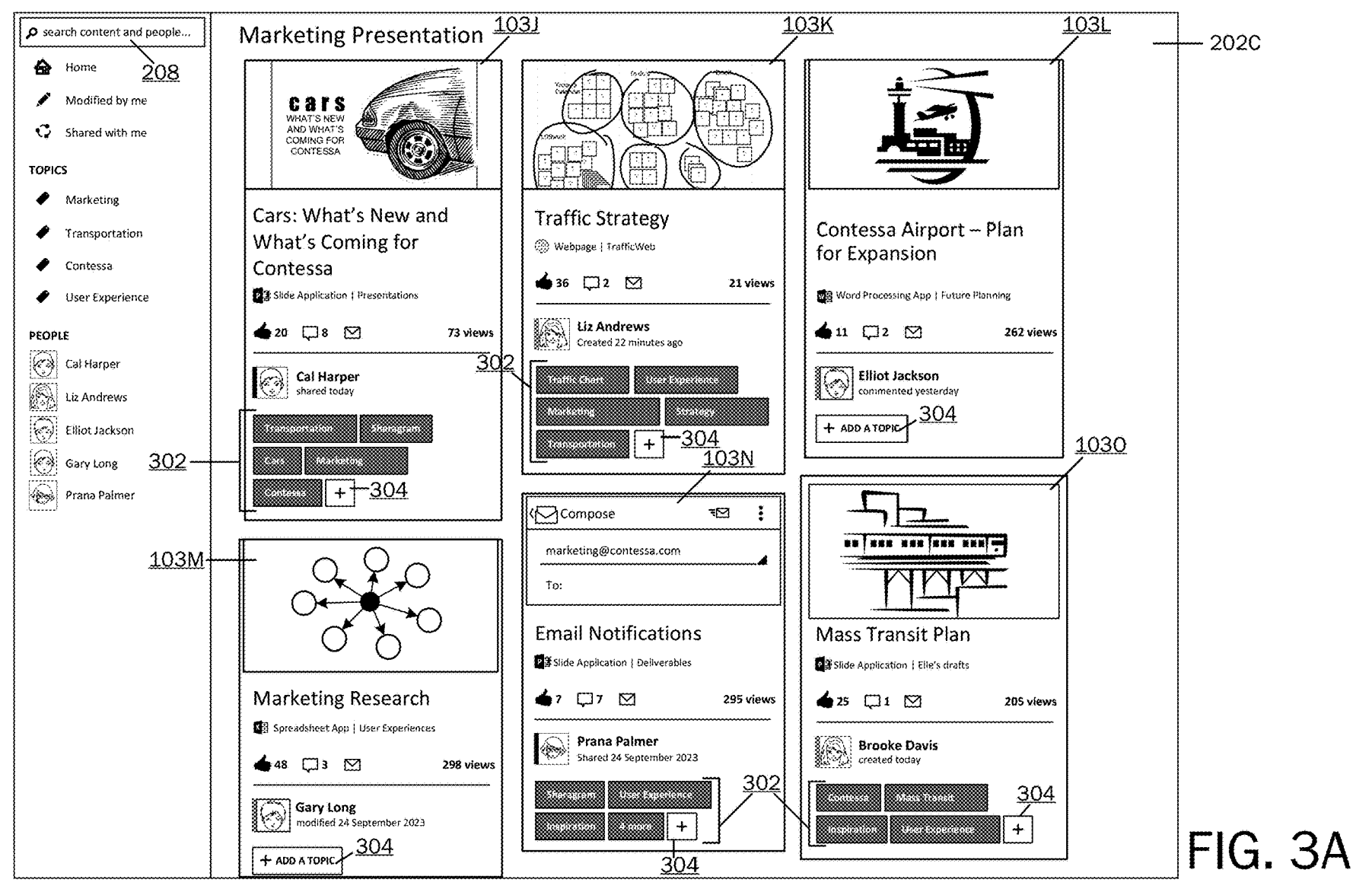

With reference now to FIG. 3A, an example board 202C comprising a plurality of content items 103J-O is illustrated. As an example, content item 103J is a slide presentation application document, and has the following topics 302 associated with it: "Transportation," "Sharagram," "Cars," "Marketing," and "Contessa."

The one or more topics 302 associated with a content item 103 may be displayed automatically, or may be accessible via an additional step such as a right-click gesture or expansion of results. As described above, a user 122 may be enabled to manage topics 302 associated with a content item 103 from a board 202, for example, a user 122 may selectively add and/or remove one or more topics 302. A topic 302 may be deleted via selection of the topic(s) 302 the user 122 wishes to disassociate from the content item 103 and a subsequent selection of a delete functionality.

A selectable UI element (herein referred to as a topic addition functionality 304) may be displayed with each content item 103 in a board 202, which when selected, may provide for adding a topic 302 for association with the content item 103. If no topics 302 have yet been associated with a content item 103, for example, like illustrated example content items 103L and 103M, the selectable topic addition functionality 304 may be displayed in a space where the topics 302 would be displayed if any were associated with the content item 103.

According to an aspect, a user 122 may be enabled to enter a search term or a text string into a search query input field, which may be processed via natural language processing, and an aggregation may be dynamically created based on the natural language processing of the query 208. The analytics engine 115 may be operable to associate a topic 302 related to a search query 208. For example, a user 122 may enter "modes of transportation" as a search query 208. The analytics engine 115 may return a document (content item 103) about a "train" that has been associated with the "modes of transportation" topic 302 via natural language processing even if the search query terms "modes of transportation" may not appear anywhere within the contents of the document.

Figure 3B:
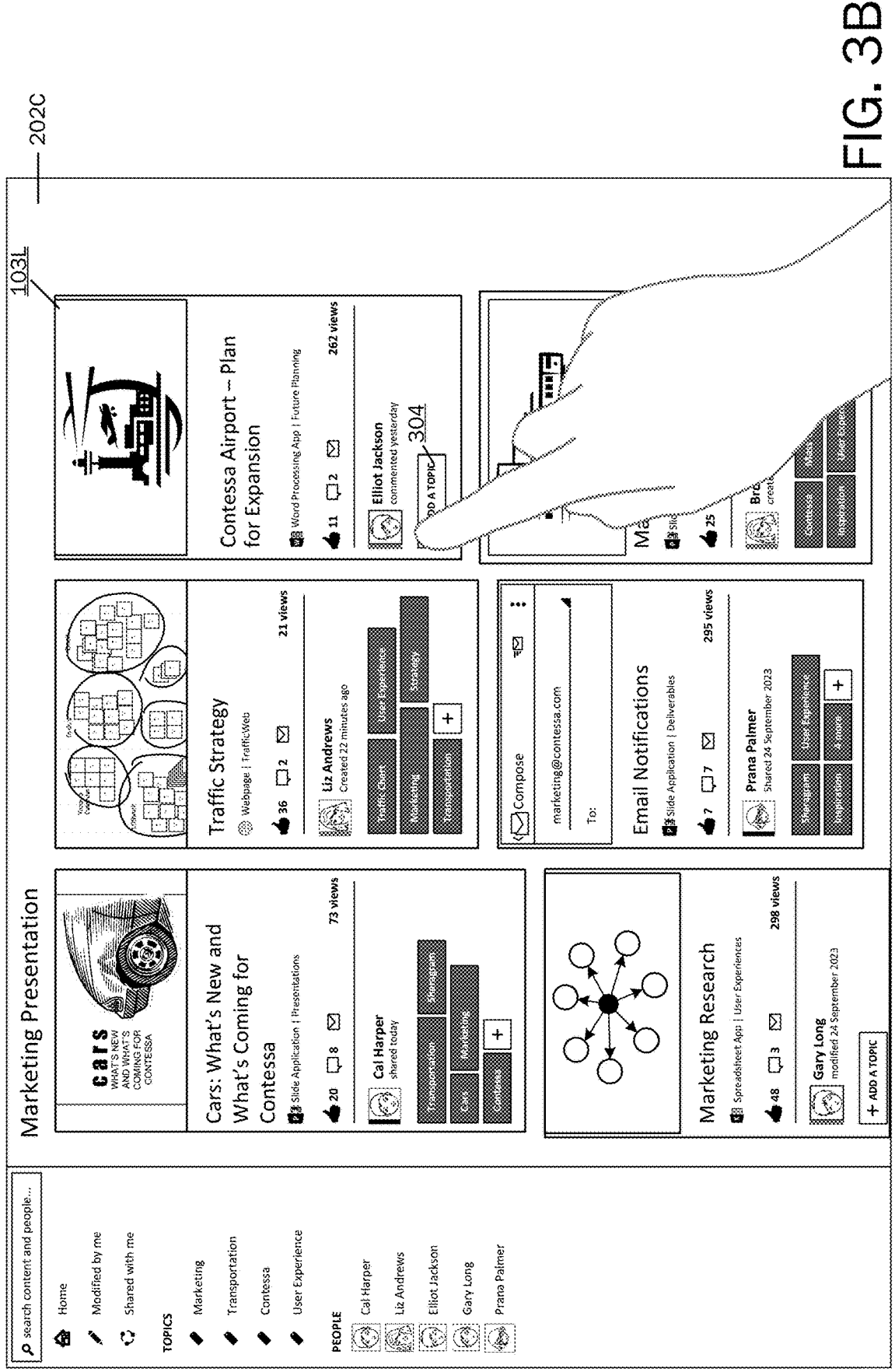
FIG. 3B illustrates a user selecting to add a topic to associate with a content item.

With reference to FIG. 3B, a user 122 selecting to add a topic 302 to associate with a content item 103 is illustrated. Although illustrated as a touch gesture, interaction with the user interface may include keystroke entry, touch screen entry, voice or other audio entry, gesture entry where an associated computing device is equipped with detection (e.g., camera) functionality for capturing and interpreting user gestures for controlling the functionality of the computing device, and the like. Upon receiving an indication of a selection of a topic addition functionality 304, a user interface element 308 may be provided where the user 122 may enter a topic 302 or select a topic 302 from one or more topic suggestions 306 that may be provided for a given content item 103, an example of which is illustrated in FIG. 3C. Topic suggestions 306 may be determined based on a variety of factors, for example, a topic 302 may be suggested if it is associated with content items 103 recently interacted with by the user 122, if it is a globally trending topic 302, if it is a topic 302 determined to be relevant to the given content item 103 based on machine learning, etc. Upon receiving an entry of a topic 302 or a selection of a topic suggestion 306, the topic 302 may be associated with the content item 103.

Figure 3D:
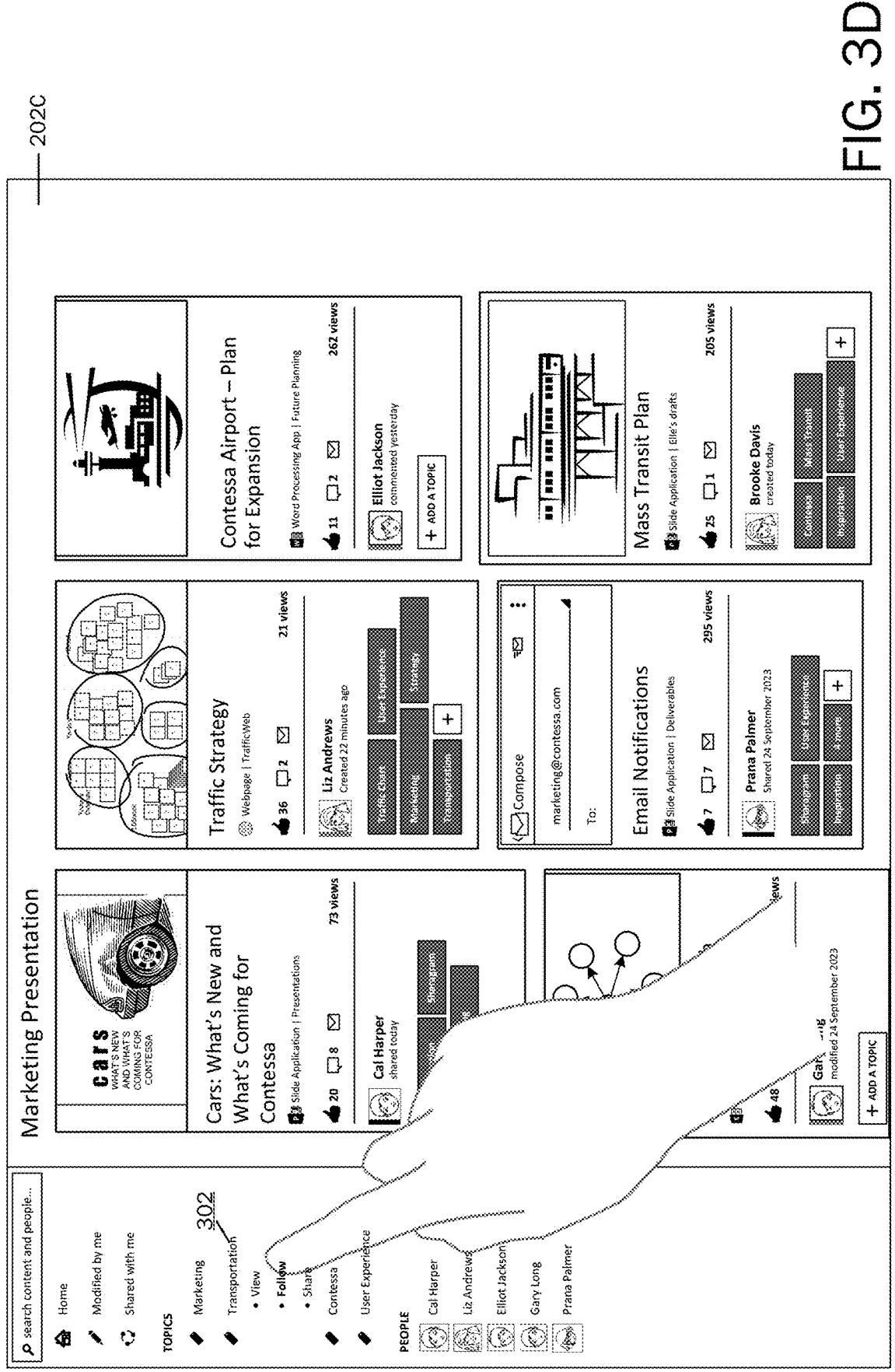
FIG. 3D illustrates a user selecting to follow a topic.

According to an aspect, a user 122 may selectively follow one or more topics 302. When a topic 302 is followed by a user 122, a notification may be provided to the user 122 when a change associated with the topic 302 occurs. For example, a user 122 may select to follow a "transportation" topic 302, as illustrated in FIG. 3D. Subsequently, an individual 102 may associate a schematic of an airplane with the "transportation" topic 302. The analytics engine 115 may detect the activity (association of the schematic of an airplane with the "transportation" topic 302), and provide a notification of the activity or a recommendation to the user 122 to view the schematic because it may be of interest to the user 122. A notification may be provided in various formats. For example, a notification may be an explicit message, a pop-up message displayed in a user interface, the relevant content item on the topic 302 (i.e., changed item) displayed in the user's landing page, etc. Notifications may be provided as changes occur or periodically.

According to an aspect, a user 122 may selectively view all topics 302 he/she follows, wherein content items 103 associated with the followed topic(s) 302 may be displayed. Accordingly, the user 122 may manage the topic(s) 302 he/she follows, and be enabled to see the most recently added or acted upon content items 103 and/or the most relevant content items 103 to the user 122. According to another aspect, the user 122 may selectively "pin" or "favorite" a subset of the followed topics 302 into a particular area of the user interface (e.g., landing page/board 202) for easy access to the "pinned" or "favorite" topics.

Figure 4A:
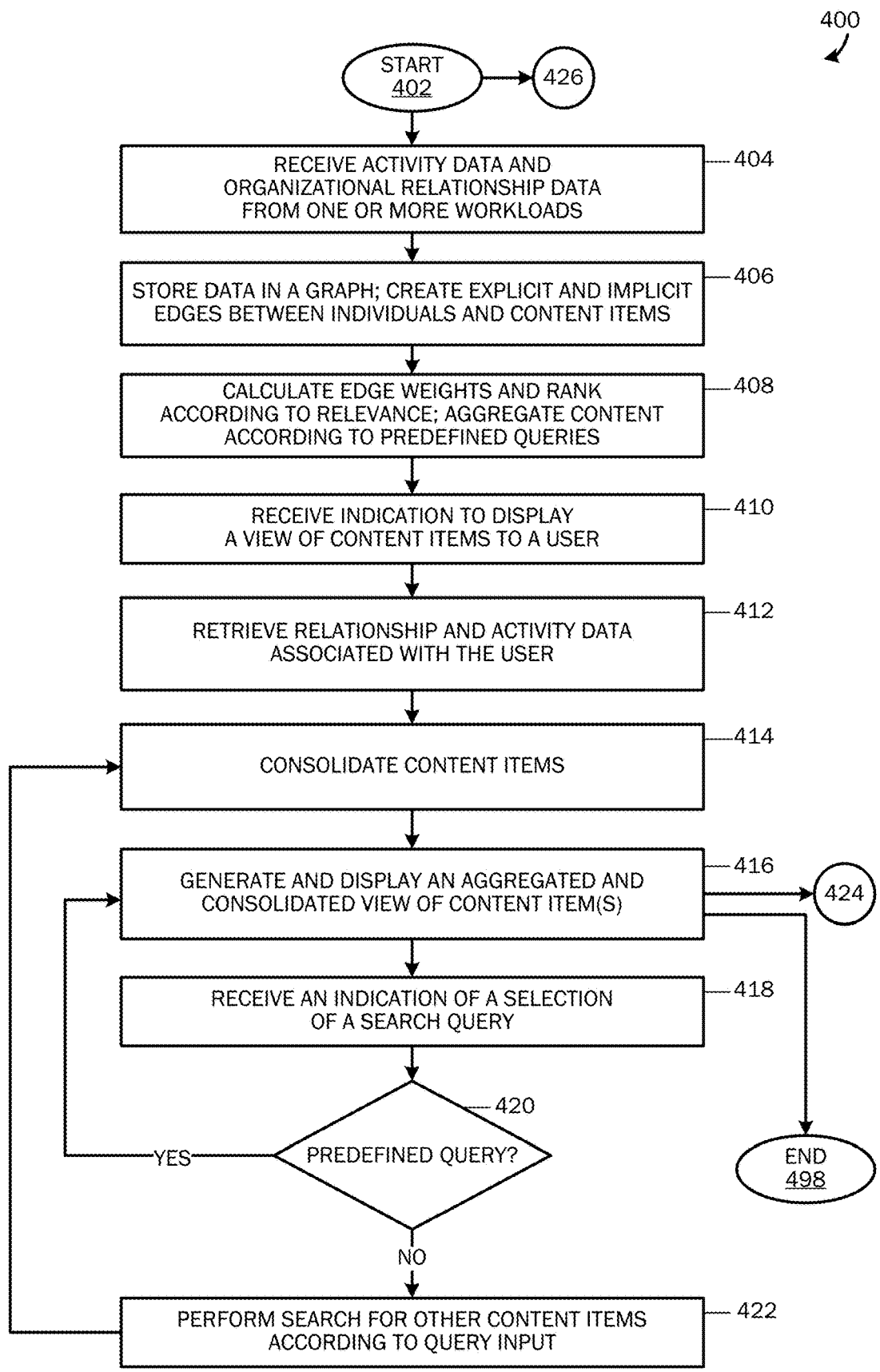
FIGS. 4A and 4B illustrate an operational flow for providing an aggregated view of top ranking content items based on relevance to a user and an aggregation of content based on user-generated topics.
Figure 4B:
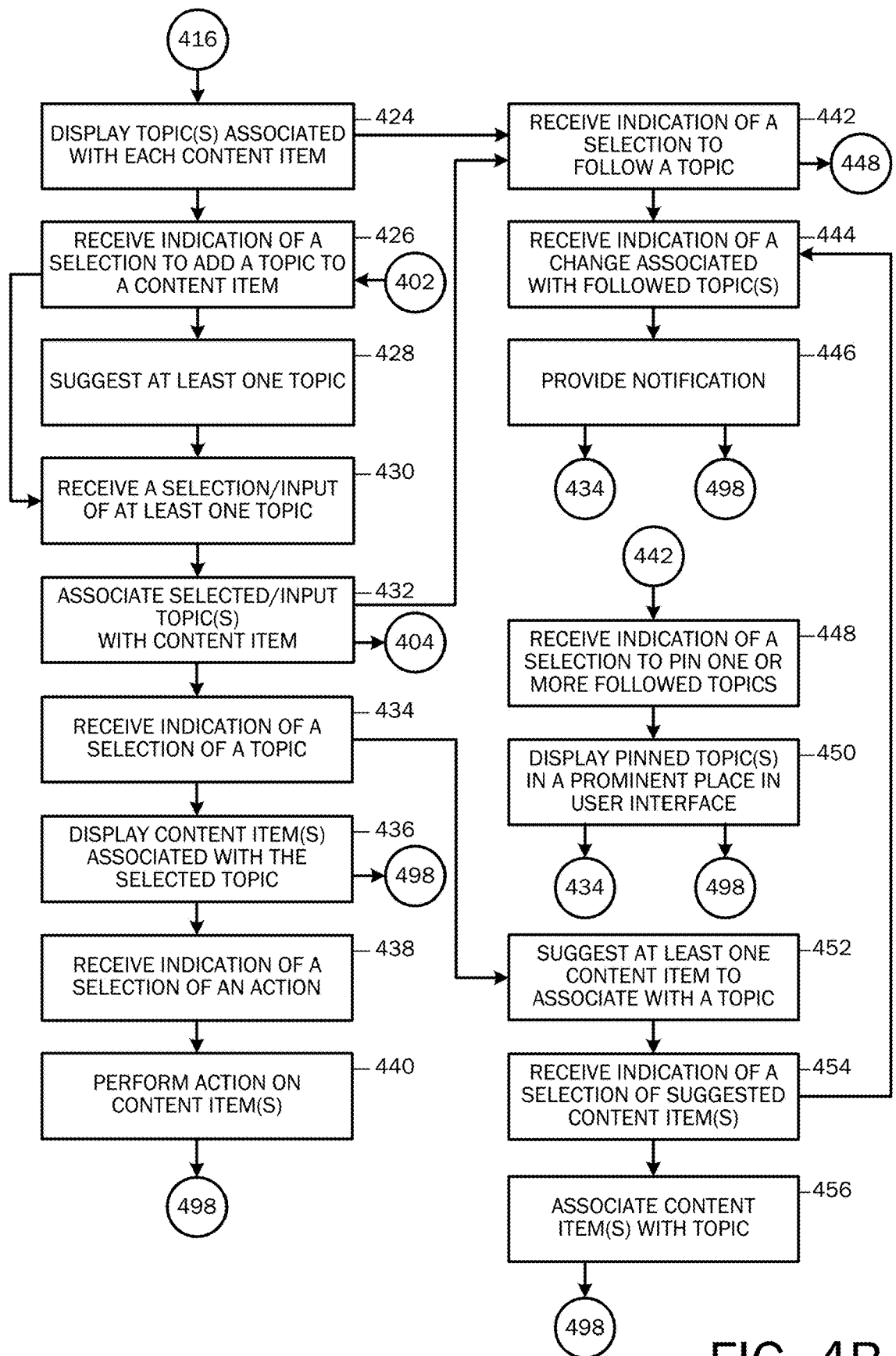

With reference now to FIGS. 4A-4B, a flow chart showing a method 400 for providing an aggregated view of top ranking content items 103 based on relevance to a user 122 and an aggregation of content items 103 based on user-generated topics 302. The method 400 starts at OPERATION 402 and may proceed to OPERATION 426 (described below) or to OPERATION 404, where activity data 106 and organizational relationship data 105 for one or more individuals 102 may be retrieved from one or more of a plurality of workloads or information sources 104. As described above, activity data 106 may comprise various types of information such as, but not limited to, presence data, data associated with authoring or modification of a document, trending data, feedback data (e.g., like, comment, follow, share, etc.), data associated with whom an individual 102 interacts and communicates, etc. Organizational relationship data 105 may comprise data associated with organizational structure (e.g., who an individual works with, works for, is a peer to, directs, manages, is managed by, etc.). The one or more workloads or information sources 104 may include information sources such as social networking services, enterprise social network services, online productivity software suites, collaboration services, communication software, etc. According to an aspect, OPERATION 404 may include a set-up process where each individual 102 may indicate which information sources 104 he/she uses from which activity data 106 and organizational relationship data 105 may be received. Each individual 102 may be required to enter authentication information for the various information sources 104.

The method 400 may proceed to OPERATION 406, where the activity data 106 and organizational relationship data 105 may be stored in a graph 114 as a collection of nodes 110 and edges 112 as described above. Relationships may be established between an individual 102 and content items 103 (e.g., documents, emails, webpages, etc.) upon which an activity was performed by the individual 102 or by other people with whom the individual 102 is associated implicitly and/or explicitly.

At OPERATION 408, weights for the edges 112 may be calculated and ranked according to their relevance to an individual 102. Weights may be calculated according to such factors as what activity is performed (e.g., a like, comment, share, follow, email, etc.) and the relationship between a first individual 102 and an individual(s) 102 performing the activity. Weights may also be based on how recently an activity was performed. A weight on a relationship edge 112A may be based on implicit or explicit signals generated through activity on the plurality of workloads, such as an amount and type of activity an individual 102 has with another person, a number of times an individual 102 interacts with a content item 103, the type of interaction, etc. Additionally, content items 103 may be aggregated into one or more queries 208 as determined by implicit and explicit signals. For example, content items 103 may be aggregated into one or more of a "popular with my colleagues" query, a "viewed by me" query, a "worked on by me" query, or a "most viewed query."

The method 400 may proceed to OPERATION 410, where an indication to display a view of content items 103 to a user 122 is received, wherein the user 122 is an individual 102 represented in the graph 114. For example, the user 122 may select to view an aggregated collection of content items 103 stored in one or more folders, document libraries, or other repositories, etc. According to an aspect, the user 122 may select to view content items 122 determined to be relevant to him/her. According to another aspect, the user 122 may select to view content items determined to be relevant to another individual 102.

At OPERATION 412, the graph 114 may be queried for relationship 105 and activity data 106 associated with the user 122 (or associated with a selected individual 102), and content items 103 relevant to the user 122 (or the selected individual 102) may be provided. At OPERATION 414, the content items 103 may be consolidated to top ranking content items 103 based on relevance to the user 122 (or individual) according to their calculated edge weights. The number of content items 103 may be a predetermined number, may be a number selected by the user 122, or may be a variable number based on a threshold of weights.

The method 400 may proceed to OPERATION 416, where an aggregated and consolidated view of relevant content items 103 may be generated and displayed in a landing page 202. As described above, the landing page 202 may comprise a grid of content items 103 ordered according to their relevance ranking.

The method 400 may end at OPERATION 498, may proceed to OPERATION 424 (described below), or may proceed to OPERATION 418, where an indication of a selection of a search query may be received. As described above, the user 122 may select a tag 206, or may select a navigation control 204 and select either select a predefined query 208 or enter a search term or a text string.

At DECISION OPERATION 420, a determination may be made as to whether the user 122 selected a predefined query 208 or entered a search term or text string. If a determination is made that a predefined query 208 is selected, the method 400 may return to OPERATION 416, where a consolidated view of aggregated content 116 may be generated and displayed in a board 202. As was described with respect to OPERATION 408, the content items 103 may be aggregated into one or more queries (e.g., a "popular with my colleagues" query, a "viewed by me" query, a "worked on by me" query, or a "most viewed query," etc.) as determined by implicit and explicit signals.

If a determination is made at DECISION OPERATION 420 that a search term or text string is received, the method 400 may proceed to OPERATION 422, where the search input may be processed, and a search for content items 103 matching the search criteria may be performed. According to an aspect, processing the search input may comprise natural language processing. Content items 103 matching the query 208 may be aggregated from the graph 114.

The method 400 may then return to OPERATION 414, where the matching content items 103 may be consolidated based on relevance to the user 122 (or individual) according to their calculated edge weights. An aggregated and consolidated view of relevant content items 103 matching parameters of the query 208 may be generated and displayed in a board 202 (OPERATION 416).

The method 400 may end at OPERATION 498, or may proceed to OPERATION 424, where, one or more topics 302, if associated with an aggregated content item 103, may be displayed, for example, as illustrated in FIGS. 3A-3D. As described above, topics 302 may be automatically displayed with a content item 103, or may be accessible via a selection to display associated topics 302 (e.g., right-click gesture, expansion of results for greater visual prominence, etc.).

The method 400 may proceed to OPERATION 442 (described below), or may proceed to OPERATION 426, where an indication of a selection to add a topic 302 for association with a content item 103 may be received. For example, the user 122 may select a topic addition functionality 304 displayed in the user interface.

The method 400 may proceed to OPERATION 428, where one or more topic suggestions 306 may be provided for the content item 103, or may proceed to OPERATION 430. Topic suggestions 306 may be determined based on a variety of factors, for example, a topic 302 may be suggested if it is associated with content items 103 recently interacted with by the user 122, if it is a globally trending topic 302, if it is a topic 302 determined to be relevant to the given content item 103 based on machine learning, etc.

At OPERATION 430, the user 122 may enter a topic 302 or select a topic 302 from one or more topic suggestions 306 that may be provided for a given content item 103. Upon receiving an entry of a topic 302 or a selection of a topic suggestion 306, the method 400 may proceed to OPERATION 432, where the entered or selected topic 302 may be associated with the content item 103.

The method 400 may return to OPERATION 404, where activity data 106 and organizational relationship data 105 for one or more individuals 102 may be retrieved from one or more of a plurality of workloads or information sources 104, may proceed to OPERATION 442 (described below), or may proceed to OPERATION 434, where an indication of a selection of a topic 302 is received.

The method 400 may proceed from OPERATION 434 to OPERATION 452 (described below) or to OPERATION 436, where an aggregated set of content items 103 associated with the selected topic 302 may be displayed. The method 400 may end at OPERATION 498, or may proceed to OPERATION 438, where an indication of a selection of an action to take on the aggregated set of content items 103 associated with the selected topic 302 may be received. For example, the user 122 may choose to share the selected topic 302 and its associated content items 103 with other individuals 102, embed the set of content items 103 associated with the selected topic 302 into other experiences, embed a stream of content items 103 associated with the selected topic 302 into other experiences, etc. As described earlier, in a case where a stream or feed of content items 103 associated with a topic 302 is embedded, the embedded stream/feed may comprise a current state of content items 103 associated with the topic 302. For example, if the given topic 302 is associated with a new content item 103, the new content item 103 may be added to the stream/feed. Additionally, the user 122 may manage content items 103 associated with a selected topic 302. For example, the user 122 may choose to associate or disassociate content items 103 with the topic 302. At OPERATION 440, the selected action may be performed on the content item(s), and the method 400 may end at OPERATION 498.

As mentioned above, the method 400 may proceed from OPERATION 424 or OPERATION 432 to OPERATION 442, where an indication of a selection to follow a topic 302 may be received. The method 400 may proceed to OPERATION 448 (described below) or to OPERATION 444, where an indication of a change associated with the selected topic 302, for example, an individual 102 associating a document with the selected topic 302.

At OPERATION 446, a notification of the change associated with the selected topic 302 may be provided to the user 122. As described above, a notification may be provided in various formats. For example, a notification may be an explicit message, a pop-up message displayed in a user interface, the relevant content item on the topic 302 (i.e., changed item) displayed in the user's landing page, etc. Notifications may be provided as changes associated with the selected topic 302 occur, or may be provided periodically. The method may return to OPERATION 434, where another topic 302 may be selected, or may end at OPERATION 498.

As mentioned above, the method 400 may proceed from OPERATION 442 to OPERATION 448, where an indication of a selection to "pin" or "favorite" one or more topics 302 is received. At OPERATION 450, "pinned" or "favorite" topics 302 may be displayed in a particular area of the user interface (e.g., landing page/board 202) for easy access to the "pinned" or "favorite" topics. The method may return to OPERATION 434 where another topic 302 may be selected, or may end at OPERATION 498.

As mentioned above, the method 400 may proceed from OPERATION 434 to OPERATION 452, where one or more content items 103 may be suggested to the user 122 to associate with a specific topic 302. An inferred edge may be created between content items 103 or between topics 302, and accordingly a suggestion may be made to associate related content items 103 (according to inferred edges) with the specific topic 302.

The method 400 may proceed to OPERATION 454, where an indication of a selection of a suggested content item 103 is received, and at OPERATION 456, the content item 103 may be associated with the topic 302. The method may end at OPERATION 498.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
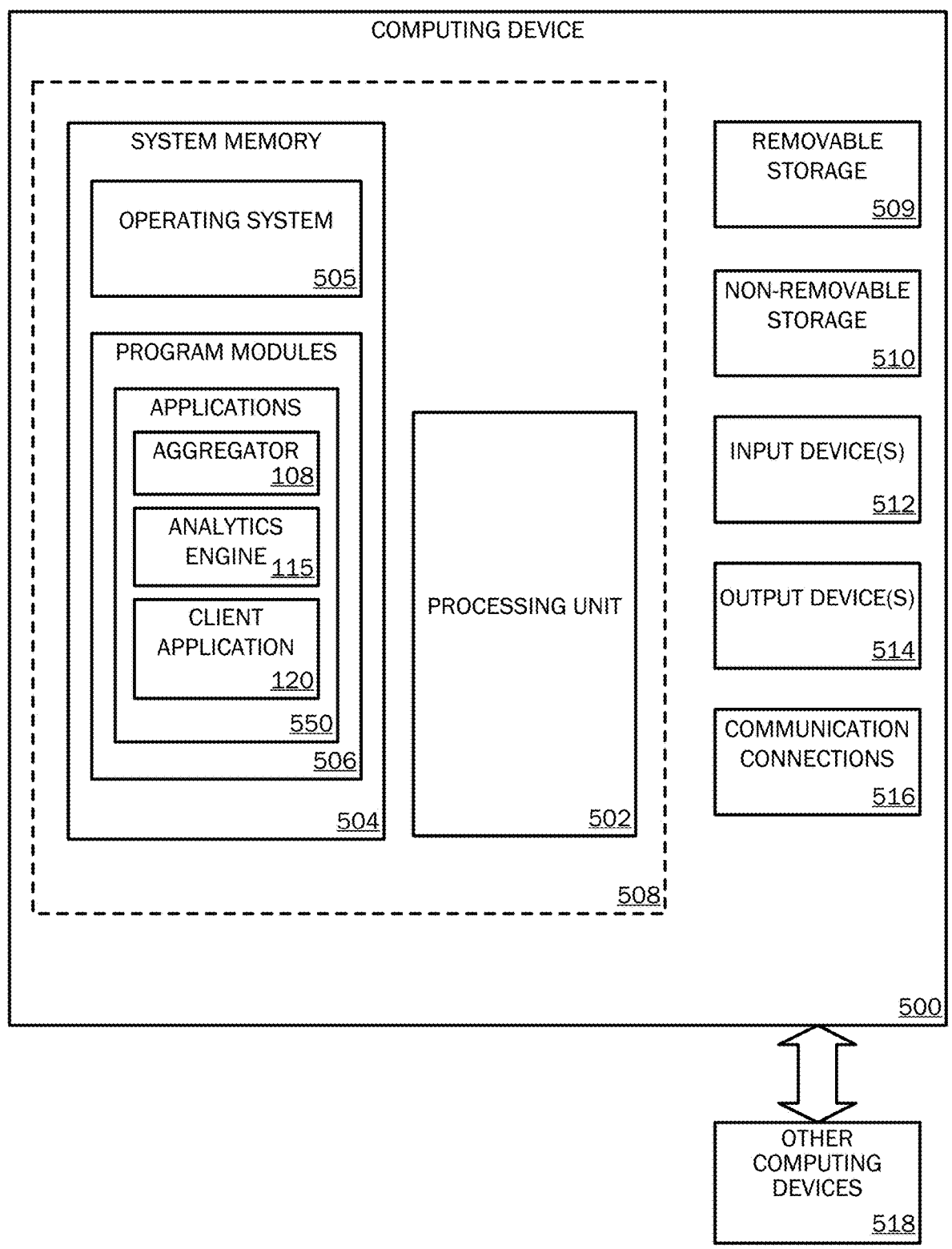
FIG. 5 is a block diagram illustrating example physical components of a computing device with which aspects of the invention may be practiced.
Figure 6A:
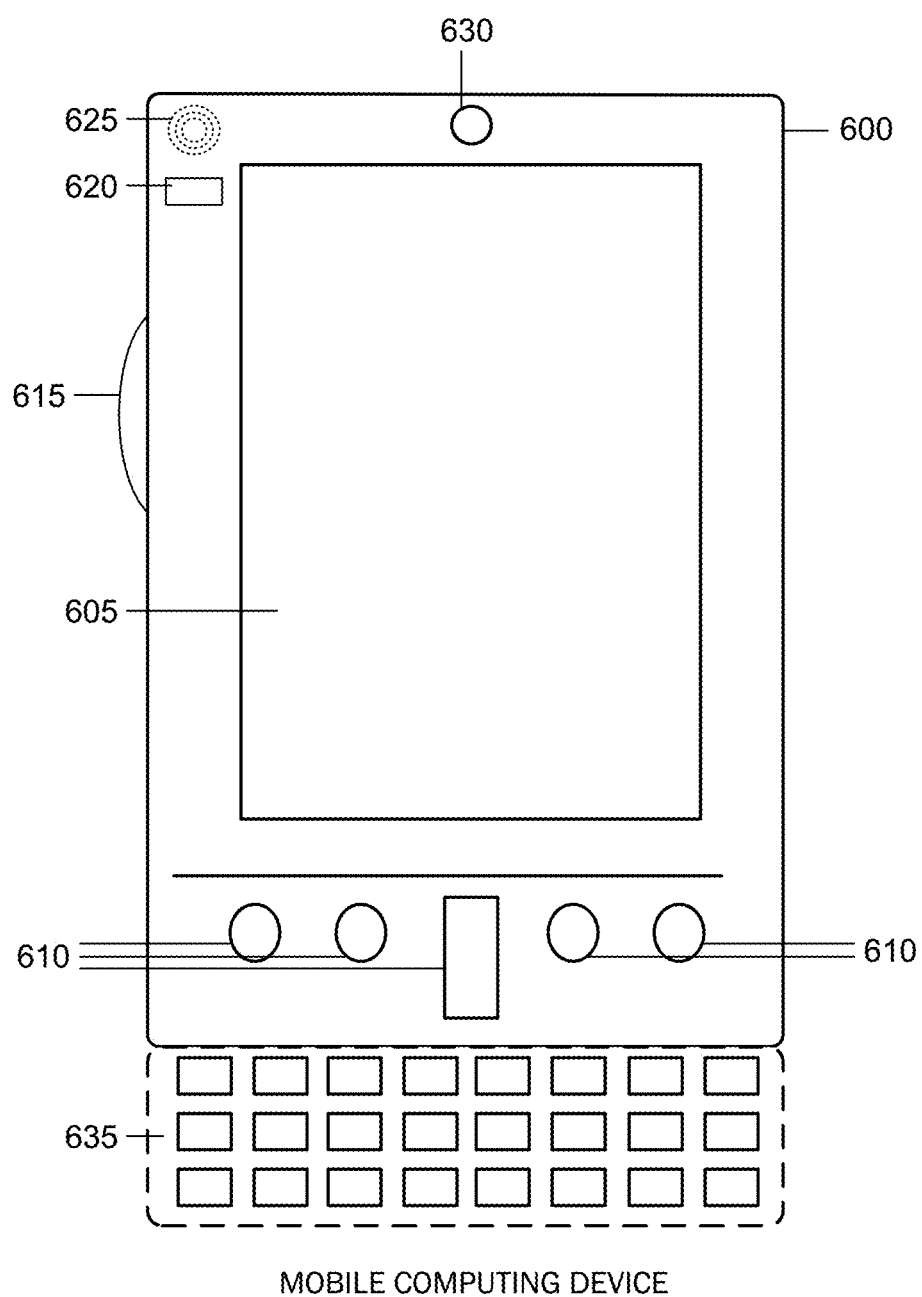
FIGS. 6A and 6B are simplified block diagrams of a mobile computing device with which aspects of the present invention may be practiced.
Figure 6B:
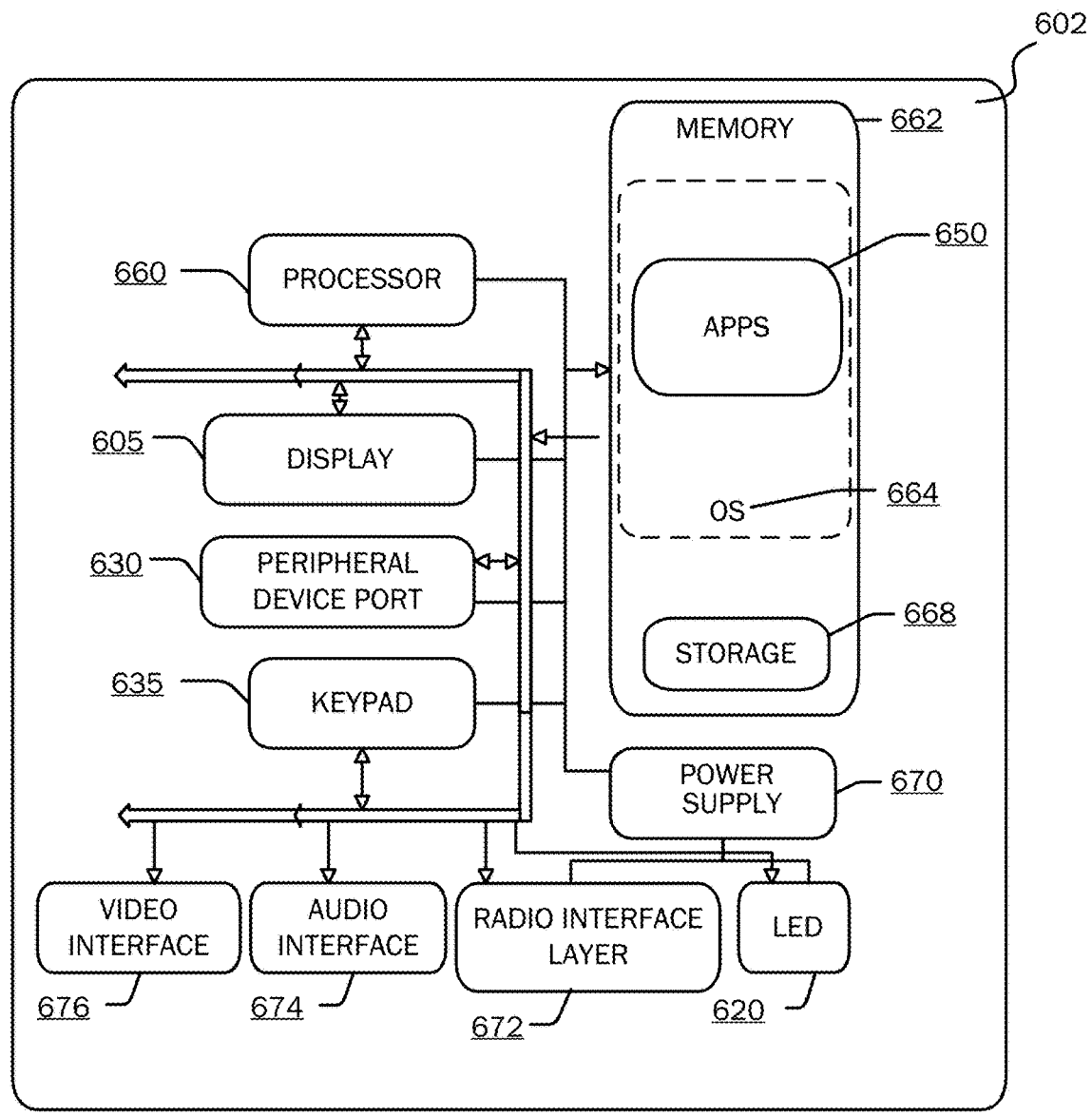
Figure 7:
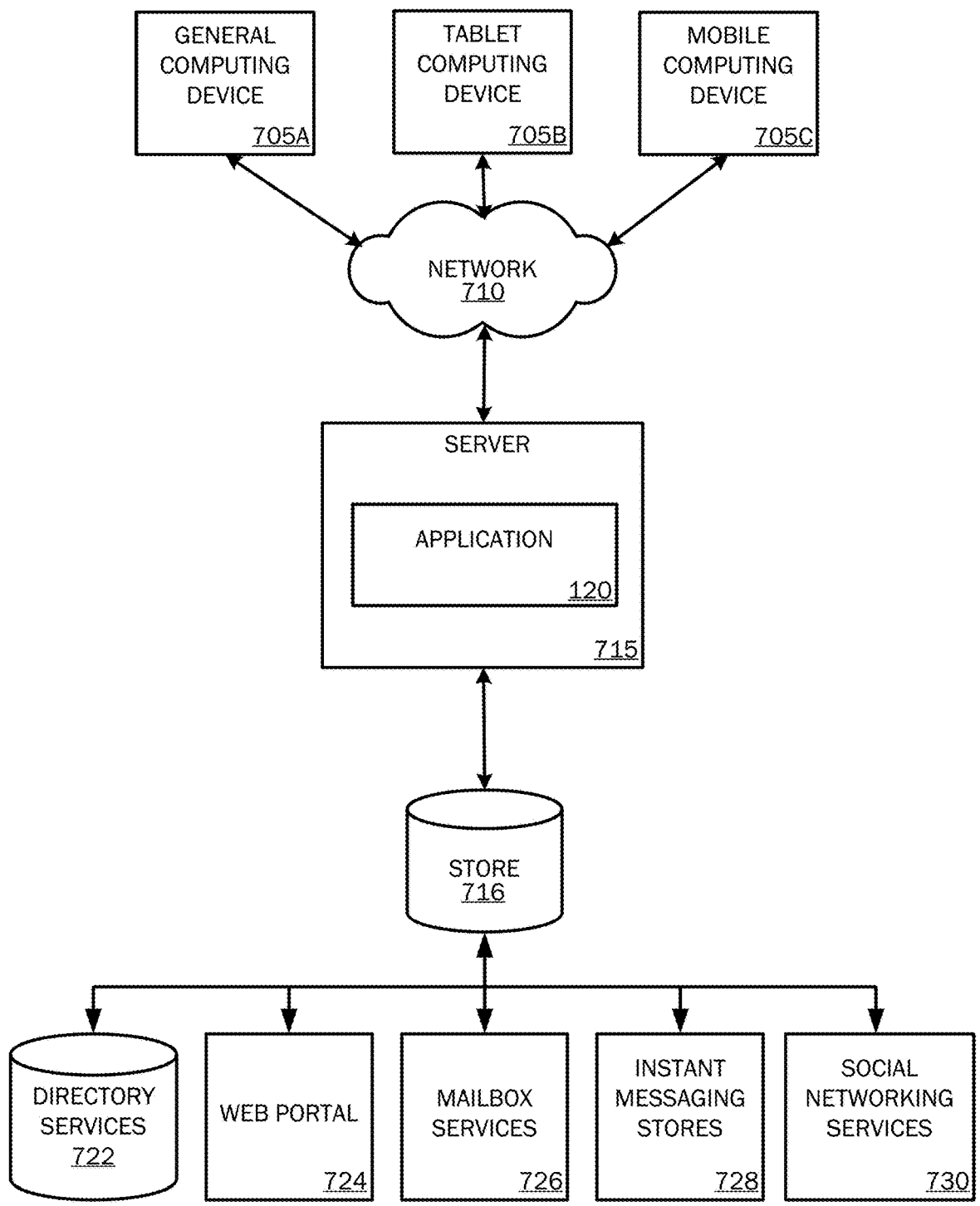
FIG. 7 is a simplified block diagram of a distributed computing system in which aspects of the present invention may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for the client device 118 described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as the aggregator 108, analytics engine 115, or client application 120. The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the method 400 illustrated in FIGS. 4A-4B. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an aggregated view of top ranking content items 103 based on relevance to a user 122 and an aggregation of content items 103 based on user-generated topics 302, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 650 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 150 via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an aggregated view of top ranking content items 103 based on relevance to a user 122 and an aggregation of content items 103 based on user-generated topics 302, as described above. Content developed, interacted with, or edited in association with the application 120 may be stored in different communication channels or other storage types. For example, various documents may be stored using a directory service 722, a web portal 724, a mailbox service 726, an instant messaging store 728, or a social networking site 730. The application 120 may use any of these types of systems or the like for providing an aggregated view of top ranking content items 103 based on relevance to a user 122 and an aggregation of content items 103 based on user-generated topics 302, as described herein. A server 715 may provide the application 120 to clients 118. As one example, the server 715 may be a web server providing the application 120 over the web. The server 715 may provide the application 120 over the web to clients 118 through a network 710. By way of example, the client computing device 118 may be implemented and embodied in a personal computer 705A, a tablet computing device 705B and/or a mobile computing device 705C (e.g., a smart phone), or other computing device. Any of these examples of the client computing device may obtain content from the store 716.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A method for providing an aggregation of content, the method comprising:
    associating content items with at least one topic relating to the content items;
    embedding a stream of content items associated with the at least one topic, in response to receiving an instruction to embed the stream of content items;
    determining a new content item is associated with the at least one topic; and
    based on determining the new content item is associated with the at least one topic, adding the new content item to the embedded stream of content items, wherein the stream of content items is retrievable by selection of the at least one topic.

2. The method of claim 1, wherein prior to associating the content items with the at least one topic:
    determining one or more suggested topics to associate with the content items; and
    displaying the one or more suggested topics as selectable topic suggestions.

3. The method of claim 2, wherein determining one or more suggested topics to associate with the content item comprises identifying at least one of:
    topics associated with content items recently interacted with by the user;
    globally trending topics; and
    topics determined to be relevant to the content item.

4. The method of claim 1, further comprising:
    displaying, in the embedded stream of content items, one or more topics associated with a content item of the embedded stream of content items, wherein each of the one or more topics is selectable.

5. The method of claim 4, further comprising:
    receiving an indication of a selected topic;
    determining one or more content items that are associated with the selected topic; and
    providing the one or more content items associated with the selected topic for display.

6. The method of claim 5, further comprising:
    receiving an indication of a selection of an action to take on the one or more content items associated with the selected topic; and
    performing the action on the one or more content items associated with the selected topic.

7. The method of claim 4, further comprising:
    receiving an indication of a selection to follow a topic of the one or more topics;
    determining a new content item associated with the followed topic; and
    providing a notification to the user of the new content item associated with the followed topic.

8. The method of claim 4, further comprising:
    receiving an indication of a selection of a topic of the one or more topics;
    determining a set of content items relevant to the topic according to one or more of: text similarity, vocabulary similarity, semantics similarity, or topic similarity; and displaying the set of content items determined as suggested content items to associate with the topic.

9. A system comprising:

at least one processor; and memory storing instructions that, when executed by the at least one processor, causes the system to perform a set of operations, the set of operations comprising:

associating a content item with at least one topic;

in response to an indication to embed a stream of content items associated with the at least one topic, embedding the stream of content items;

determining a new content item is associated with the at least one topic; and adding the new content item to the embedded stream of content items.

10. The system of claim 9, wherein associating the content item with the at least one topic is performed based on a received selection of the at least one topic.

11. The system of claim 9, wherein the set of operations further comprises:

determining one or more suggested topics to associate with the content items; and displaying the one or more suggested topics as selectable topic suggestions.

12. The system of claim 11, wherein determining one or more suggested topics comprises identifying at least one of:

topics associated with content items recently interacted with by the user;

identifying globally trending topics; or topics determined to be relevant to the content item.

13. The system of claim 9, wherein the set of operations further comprises:

displaying, in the embedded stream of content items, one or more topics associated with the content item, wherein each of the one or more topics is selectable.

14. The system of claim 13, wherein the set of operations further comprises:

receiving an indication of a selected topic;

determining one or more content items that are associated with the selected topic; and displaying the one or more content items associated with the selected topic.

15. The system of claim 9, wherein the set of operations further comprises:

receive an indication of a selection of a topic to associate with the content item; and associate the selected topic with the content item.

16. A computer-readable storage device containing computer executable instructions that, when executed by a computer, perform a set of operations for providing an aggregation of content based on user-generated topics, the set of operations comprising:

associating content items with a topic that relates to the content items;

embedding a stream of content items associated with the topic based at least in part on receiving an instruction to embed the stream of content items;

determining a new content item is associated with the topic; and based on determining the new content item is associated with the topic, adding the new content item to the embedded stream of content items.

17. The computer-readable storage device of claim 16, wherein the set of operations further comprises:

determining one or more suggested topics to associate with the content items; and displaying the one or more suggested topics as selectable topic suggestions.

18. The computer-readable storage device of claim 16, wherein the set of operations further comprises:

displaying, in the embedded stream of content items, one or more topics associated with a content item of the embedded stream of content items, wherein each of the one or more topics is selectable.

19. The computer-readable storage device of claim 18, wherein the set of operations further comprises:

receiving an indication of a selected topic;

determining one or more content items that are associated with the selected topic; and displaying the one or more content items associated with the selected topic.

20. The computer-readable storage device of claim 18, wherein the set of operations further comprises:

receiving an indication of a selection to follow a topic of the one or more topics;

determining a new content item associated with the followed topic; and providing a notification to the user of the new content item associated with the followed topic.

* * * * *